United States Patent [19]

Bistak et al.

[11] Patent Number: 4,746,688

[45] Date of Patent: May 24, 1988

[54] REMOLDABLE, WOOD-FILLED ACOUSTIC SHEET

[75] Inventors: Leo T. Bistak, Sterling Heights; Daniel C. Himebaugh, Ann Arbor, both of Mich.

[73] Assignee: Ford Motor Company, Dearborn, Mich.

[21] Appl. No.: 52,680

[22] Filed: May 21, 1987

[51] Int. Cl.$^4$ .......................... C08K 3/34; C08K 7/00; C08K 11/00

[52] U.S. Cl. ...................................... 523/220; 524/13; 524/15; 524/35; 524/451; 524/525

[58] Field of Search .................... 523/220; 524/35, 13, 524/15, 525

[56] References Cited

U.S. PATENT DOCUMENTS

| | | |
|---|---|---|
| 3,037,954 | 6/1962 | Gessler et al. . |
| 3,835,201 | 9/1974 | Fischer . |
| 3,888,810 | 6/1975 | Shinomura ............................ 524/13 |
| 3,904,456 | 9/1975 | Schwartz . |
| 4,013,616 | 3/1977 | Wallace ................................ 524/571 |
| 4,045,403 | 8/1977 | Lever et al. ......................... 524/528 |
| 4,116,914 | 9/1978 | Coran et al. . |
| 4,191,798 | 3/1980 | Schumacker et al. . |
| 4,192,785 | 3/1980 | Chen et al. .......................... 523/121 |
| 4,203,876 | 5/1980 | Dereppe et al. ..................... 524/13 |
| 4,203,884 | 5/1980 | Coran et al. . |
| 4,228,116 | 10/1980 | Colombo et al. ................... 264/122 |
| 4,348,501 | 9/1982 | Coran et al. . |
| 4,368,280 | 1/1983 | Yui et al. ............................. 524/515 |
| 4,379,190 | 4/1983 | Schenck . |
| 4,403,007 | 9/1983 | Coughlin . |
| 4,409,345 | 10/1983 | Moteki et al. ........................ 524/13 |
| 4,430,468 | 2/1984 | Schumacher . |
| 4,434,258 | 2/1984 | Schumacher et al. . |
| 4,480,061 | 10/1984 | Coughlin et al. . |
| 4,480,074 | 10/1984 | Wang . |
| 4,555,546 | 11/1985 | Patel . |
| 4,582,871 | 4/1986 | Noro et al. .......................... 524/451 |
| 4,652,475 | 3/1987 | Haney et al. ........................ 428/36 |
| 4,654,262 | 3/1987 | Alonso ................................ 428/353 |

*Primary Examiner*—Herbert J. Lilling
*Attorney, Agent, or Firm*—Lorraine S. Melotik; Roger L. May

[57] ABSTRACT

This invention is directed to a thermoplastic composition comprising polyolefin resin, cellulosic particulate and crosslinked elastomeric rubber microparticles, which composition can be extruded into sheets and subsequently remolded into three dimensional, thermoplastic articles having sound-deadening properties. Preferably, the polyolefin is polypropylene homopolymer and the cellulosic particulate is woodflour.

25 Claims, No Drawings

REMOLDABLE, WOOD-FILLED ACOUSTIC SHEET

TECHNICAL FIELD

This invention is directed to a thermoplastic composition comprising polyolefin resin, cellulosic particulate and crosslinked elastomeric rubber microparticles, which composition can be extruded into sheets and subsequently remolded into rigid, three dimensional, thermoplastic articles having sound-deadening properties.

BACKGROUND OF THE INVENTION

Extrusion of thermoplastic polymer compositions is a well known method for mass producing finished or semi-finished articles. Conventional thermoplastic compositions for extrusion processing contain a thermoplastic polymer, generally as the main constituent, and inorganic and/or organic fillers. Wood flour is often employed as the organic filler. Wood-filled thermoplastic compositions can be extruded or injection molded into articles which are relatively lighter in weight and less expensive than similar mineral filled thermoplastic articles made without the wood flour. At the same time, such wood-filled articles have certain desirable physical properties which are the same as or, generally, better than those of articles made from similar thermoplastic materials not containing the wood flour. Therefore, wood-filled thermoplastic compositions are employed to make articles suitable for a variety of uses.

U.S. Pat. No. 4,203,876 to Dereppe et al teaches a moldable composition consisting essentially of thermoplastic polymers, vegetable materials such as wood flour and a synthetic elastomer. It is suggested therein that the moldable compositions can be used to manufacture cases of crates intended for the storage and transportation of perishable products such as fruits and vegetables.

In U.S. Pat. No. 4,228,116 to Colombo et al., a method for producing remoldable panels is taught. The method comprises forming a particulate mixture of thermoplastic polymer and particulate organic filler, e.g., wood particles, plastifying and extruding the mixture into a web, and rolling the web, which may subsequently be cut into panels. Colombo et al suggest that the plastic panels may be used as is or they may be reheated and pressed into three dimensional shapes, e.g., into furniture and dashboards or other components for automobiles.

U.S. Pat. No. 4,480,061 to Coughlin et al. teaches articles having a wood-like appearance and made from a composition comprising cellulosic materials, e.g., wood flour, ethylene interpolymers and processing oil. The compositions are suggested useful for molding into articles having a wood-like appearance such as picture and window frames.

Current rigid, wood-filled, thermoplastic articles have inherent deficiencies however which limit their usefulness in automobiles. For example, they tend to be somewhat brittle and thus if used in an area where they are difficult to install, they may crack during installation. Still further, they have less than desirable sound-deadening properties. Such articles, if intended for use in motor vehicles, should desirably be sound absorbing-/reflecting, i.e., sound-deadening. In an automobile, noise can enter from outside the vehicle, e.g., road or tire noise, from the trunk due to the collision of objects therein, or can be that vibrational noise transmitted to structural components inside the vehicle from the engine or drive train. Such transmitted vibrational noise may also be picked up by the automobile components as a sympathetic vibration and is termed "drumming". If a thermoplastic wood-filled article were to be used in an automobile as, e.g., a package tray positioned between the trunk and the passenger section of the automobile, it must also be capable of being sound-deadening. This means that it desirably is capable of absorbing noise travelling in from the trunk, of absorbing road noise, and further that it does not pick up sympathetic vibrations from sound impinging on it through adjoining structures, i.e., it does not "drum".

In order to improve the sound-deadening properties of currently employed wood-filled thermoplastic articles (e.g., automobile package trays), they are encased (sandwiched) between thick sound-absorbing materials such as sound-absorbing urethane, shoddy/cotton or other fiber mat. The use of various sound-absorbing sheeting materials in automobiles is well known in the industry and in patent literature. For example, in U.S. Pat. Nos. 4,191,798, 4,403,007, 4,430,468, 4,434,258 and 4,379,190, ethylene based sheeting materials are disclosed to be useful for their sound-deadening properties and may be employed as automobile carpet backings. U.S. Pat. No. 3,904,456 to Schwartz, discloses self-supporting sound-deadening sheets of ethylene-vinyl acetate copolymer highly loaded with inorganic filler material. The sheets can be molded into, e.g., fender well sections or can be applied to a component of the automobile, e.g., a body panel, to inhibit the transmission of airborne noises. It is the use of high density inorganic filler in these sheeting materials which absorbs or reduces the sound transmission. However the manufacture of a finished article by sandwiching the thermoplastic material between layers of sound-deadening material requires complex production and assembly techniques. It would be preferable if a finished article could be made from a thermoplastic composition which had good sound-deadening properties of its own. Finished articles could be produced from such thermoplastic compositions encased within thinner sound-absorbing materials or none at all, while still having suitable sound-deadening properties. Such a composition would thus allow for the production of wood-filled thermoplastic finished articles, having sound-deadening properties, into crisp and more complex three dimensional shapes.

It is thus highly desirable to formulate a thermoplastic composition which is extrudable and subsequently remoldable into articles having sound-deadening properties. It is additionally desirable that such an article has limited flexibility, yet at the same time, is tough and impact resistant, i.e., it is be rigid without being brittle, so as to allow installation of the article without cracking. However, the fact is that if a conventional thermoplastic wood-filled article is to be employed in an automobile and it is to have sound-deadening properties, it is still encased in thick layers of sound-deadening materials.

We have now found that inclusion of small crosslinked elastomeric rubber particles into a thermoplastic composition produces molded articles with the desired properties described above, i.e., they are rigid without being brittle, are impact resistant and tough and have excellent sound-deadening properties. These sound-deadening properties of the composition can be further enhanced by the inclusion of optional organic fillers like barium sulfate.

None of the references mentioned above, either those directed to wood-filled materials or those directed to the sound-absorbing sheetings, teach Applicants' composition comprising polyolefin resin filled with cellulosic particulate and crosslinked elastomeric rubber microparticles.

DISCLOSURE OF THE INVENTION

The present invention is directed to an extrudable thermoplastic composition suitable for producing rigid, remoldable, panels having sound-deadening properties. The extrudable composition comprises a mixture of: (A) 100 parts by weight polyolefin resin having a softening point of at least about 120° C.; (B) between about 20 and about 150 parts by weight cellulosic particulate filler having a length/diameter ratio between about 1 and about 10 and a particle size between about 0.01 mm to about 1.5 mm; and (C) between about 20 and about 120 parts by weight crosslinked elastomeric rubber particles having an average particle diameter of less than about 50 microns and being dispersible in said extrudable composition. The composition preferably further comprises talc and, optionally, other inorganic filler materials. Still other optional materials desirably included in the thermoplastic composition include color concentrate and wax. Preferably the polyolefin resin is polypropylene homopolymer and the cellulosic particulate filler comprises woodflour.

Advantageously, the composition of the present invention provides an extrudable mixture which can be remolded into thermoplastic articles having excellent sound-deadening properties. Little or no additional sound-deadening materials are need to make the finished articles suitably sound-deadening for automobile use. This advantageously allows for the molding of articles having crisp and complex shapes.

Wood-filled thermoplastic articles prepared according to this invention also possess a cost advantage when compared to finished, sound-deadening, wood-filled thermoplastic articles conventionally employed in automobiles. This is the case even in spite of the fact that a wood-filled thermoplastic composition according to the present invention may be relatively more expensive than conventional wood-filled thermoplastic compositions. Such cost advantage results from the fact that thinner or no additional padding is required for the present invention article as compared to conventional articles in order to achieve similar or better sound-deadening properties. This results in an overall savings in the cost of materials used to manufacture articles according to the present invention.

DETAILED DESCRIPTION OF THE INVENTION

Suitable thermoplastic polyolefin resins comprise crystalline, high molecular weight solid products which have a softening point of at least about 120° C., preferably at least about 150° C. Such synthetic macromolecular substances have molecular weights in the film forming range and when heated soften and become distorted. Upon cooling, such substances revert to their normally solid state. Such thermoplastic polyolefin resins result from the polymerization of one or more monoolefins in which the unsaturation is in the terminal position and the molecule contains from 2 to 20 carbon atoms. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. The thermoplastic polyolefin resins of the present composition may also result from the copolymerization of these olefins with one another as well as with other monomers copolymerizable with them. These other copolymerizable monomers can be for example, diolefins such as butadiene, isoprene, the hexadienes and and vinyl acetate. The resulting copolymer resins can be either random copolymers of block copolymers. These block copolymers consist of successions of chain segment of varying lengths. Each segment consists of a homopolymer of an alpha-olefin or of a random copolymer comprising two or more comonomers as defined above. If such copolymers are employed in the present extrudable composition, the copolymer generally contains at least 90 mole percent olefinic monomers. The polyolefin resins can be produced by either high or low pressure processes.

Commerically available thermoplastic polyolefin resins, and preferably polyethylene or polypropylene, may be advantageously used in the practice of the present invention, with polypropylene being more preferred; atactic polymers are unsuitable. The thermoplastic polyolefin resin can be used in any form which allows it to be mixed with the other components of the extrudable composition. Preferably, it is devoid of large particles. It can be in the form of a powder, of particles, of granules, of flakes, of fibers, of ground scrap and compatible mixtures of any of these forms.

Cellulosic material is included in the present invention composition as particulate filler having a length/diameter ratio between about 1 and about 10 and a particle size (largest dimension) between about 0.01 and and 1.5 mm. Preferably, the particle size of the cellulosic particulate filler is between about 0.15 and about 0.425 mm. Fibrous fillers in the sense of having the general outer shape of fibers (length substantially greater than diameter) are not employed as a cellulosic particulate filler in the present invention. The term "cellulosic" as used in this invention refers to materials which are produced from wood or other vegetable matter. It is preferred to employ materials originating from the wood of conifers or of deciduous trees, such as pine, spruce, fir, eucalyptus, beech, oak, poplar and the like. The most advantageous wood material in the United States, from the economical point of view, is pine. Although materials originating from wood are preferred for producing articles according to the present invention, the use of other vegetable materials such as the soft portion of corn cobs, rice hulls, shredded newspaper and shells such as peanut shells and walnut shells is possible. Mixtures of such materials may also be employed as the cellulosic particulate filler component in the present composition. Thus the cellulosic particulate filler comprises comminuted particles of the above cellulosic materials, such as sawdust, saw chips, wood flour and ground corn cobs, with flours and most particularly wood flours being preferred. Substantially dry cellulosic particulate fillers (water content less than about 10 percent by weight, more preferably between about 4 and about 8 percent, most preferably about 5 percent by weight of the filler) are preferred. The amount of cellulosic particulate filler employed in the composition of the present invention is between about 20 and about 150 parts by weight based on 100 parts by weight of the polyolefin resin present in the extrudable composition.

As discussed above, the composition of the present invention has excellent sound-deadening properties which result from the inclusion of particularly defined crosslinked elastomeric rubber particles dispersible in the extrudable composition. The crosslinked elastomeric rubber particles so employed have a particle diameter of less than about 50 microns. Preferably, the particle diameter of the elastomeric rubber particles is less than about 10 microns, most preferably between about 0.1 and about 2 microns. It was found that the use of crosslinked elastomeric rubber particles having diameters larger than about 50 microns, e.g., 177 microns, resulted in thermoplastic materials having improved strain characteristics in tensile tests but, on the other hand, poorer properties as evaluated by rhemotric impact tests, i.e., they remained brittle. Attempts to use uncrosslinked elastomeric rubber particulate in the present composition, in place of the crosslinked particles, resulted in an article not having the excellent sound-deadening properties of the present invention article. Additionally, such articles made with uncrosslinked rubber particles have an undesirably lowered heat distortion temperature. Still further, while the crosslinked particles can be included in the composition in significant amounts, we have found that such uncrosslinked particulate could only be incorporated in the composition in limited amounts, otherwise other physical properties of the article begin to deteriorate.

The crosslinked elastomeric rubber particles are present in the extrudable composition in an amount of between about 20 and about 120 parts by weight based on 100 parts of polyolefin resin in the composition. Exemplary of crosslinked elastomeric rubber particles which may be employed in the present extrudable composition are those formed of natural rubber, synthetic polyisoprene, styrene-butadiene rubbers, polybutadiene rubbers, bromobutyl rubber, chlorobutyl rubber, ethylene propylene rubbers including, e.g., ethylene propylene terpolymers (EPDM), nitrile elastomers, silicone elastomers, vinyl acetate ethylene copolymers, chlorosulfonated polyethylene and the like as well as compatible mixtures of any of them. The crosslinking of the rubber may be effected by any known rubber curative system. Examples of suitable curatives are accelerated sulfur systems including efficient and semi-efficient systems, peroxide systems alone or with co-agents, phenolic resin curative systems, phenylenebismaleimide, urethane curatives, and diamine curatives. The amount of curative can be varied, but generally is that quantity required to cause sufficient numbers of crosslinks to obtain a technical cure. However, the rubber should not the too highly crosslinked, i.e., the crosslink density should not be so high so as to reduce the elasticity to the extent that it is no longer rubbery. As will be apparent to one skilled in the art, such crosslinked rubbers may optionally be compounded with processing oils, fillers, and the like.

The crosslinked elastomeric rubber particles included in the present composition can be prepared by comminuting or pulverizing a crosslinked rubber material, such as those described above, to the desired small particle size, i.e., less than about 50 microns. However, the crosslinked elastomeric rubber particles can also be prepared by other methods, e.g., dynamic vulcanization. The technology of dynamic vulcanization is based on the principle of in-situ vulcanization of conventional thermostat rubber polymers during mixing with thermoplastics. This procedure generates fully cured rubber microparticles dispersed in a continuous thermoplastic matrix. Particles prepared in this way have a particle size generally less than about 50 microns, often less than about 10 microns. Various patent teach the preparation of such crosslinked elastomeric rubber particles in-situ in thermoplastics. Exemplary of such patents are U.S. Pat. Nos. 3,037,954, 3,835,201, 4,116,914, 4,203,884, 4,348,501, 4,480,074 and 4,555,546, which are expressly incorporated herein for their teaching relative such dynamic vulcanization techniques and the crosslinked rubber particles/thermoplastic compositions produced thereby.

The process of dynamic vulcanization is applicable to any vulcanizable rubber and crystalline thermoplastic resin which is compatible or compatibilizable. According to this technique, the thermoplastic material, the uncrosslinked rubber, the curative and optional materials such as cure accelerators are charged into a mixing extruder, for example, a twin screw mixer in an amount giving the optimum charge for the particular mixer. Dynamic vulcanization is then carried out in the conventional manner, e.g., in a continuous process, via selection of the appropriate temperature and residence time to obtain a composition comprising a blend of cured rubber and plastic. The relative proportions of cured rubber and plastic in the product composition can vary due to e.g., type of rubber and plastic, the type and amount of curative, the presence or absence of plasticizer, extender oil, pigments, carbon black, clay, and the type of mixer used. The curing agents used for curing the blends of uncrosslinked rubber and plastic are curing agents such as those described above with the exception of the peroxide catalysts which cannot be used successfully since they degrade rubber, e.g., polypropylene, at curing temperatures.

The crosslinked rubber/thermoplastic compositions described in the patents incorporated above include chlorinated butyl rubber/polypropylene, EPDM/polyolefin, ethylene vinyl acetate/polyolefin, epichlorohydrin/carboxy ethylene polymer, polynorbornene/polyolefin and acrylic ester copolymer/polyolefin. The resultant crosslinked rubber particle/thermoplastic compositions are generally taught to be useful to be molded into thermoplastic articles. Exemplary of commercially available dynamically vulcanized crosslinked rubber particles/thermoplastic compositions are crosslinked EPDM rubber particles/polypropylene available as Santoprene (trademark, Monsanto Chemical Co., St. Louis, MO) and crosslinked nitrile rubber particles/polypropylene available as Geolast (trademark, Monsanto Chemical Co.).

As discussed above, the crosslinked elastomeric particles included in the composition of the present invention can be produced e.g., by comminuting crosslinked elastomeric material to the proper particle diameter or by dynamic vulcanization techniques which inherently produce particles having a diameter of less than about 50 microns, generally less than about 10 microns. If the particles are produced by dynamic vulcanization, the particles will be incorporated into the extrudable composition in the form of a particle/thermoplastic mixture, i.e., in the medium in which they are formed. As will be apparent to one skilled in the art in view of the present disclosure, the thermoplastic resin of the particle/thermoplastic mixture should be compatible with the polyolefin resin of the present extrudable composition.

While two methods for producing crosslinked elastomeric rubber microparticles suitable for use in the present invention have been described, these methods are not meant to limit production of the crosslinked particles employed in the composition of the present invention to these methods. Any method by which crosslinked elastomeric rubber microparticles may be produced is suitable.

The present invention composition preferably comprises ground talc, more preferably the talc is finely ground. As is known to those skilled in the art, talc is anhydrous magnesium silicate, $3MgO.4SiO_2.H_2O$. It is believed that the talc facilitates the mixing of the components and extrusion of the mixture, more particularly that it aids in the breaking up of the agglomerates of particulate. The extrudable composition of the present invention may optionally comprise other inorganic fillers such as vermiculite, sulfates, carbonates, oxides, sulfides, chlorides, and the like. Preferably, these other optional inorganic fillers are selected from conventional inorganic filler materials like calcium carbonate, iron oxide, lead oxide, mica, and barium sulfate, with the latter being preferred. Generally, these other inorganic fillers would be employed if it is desired to enhance certain physical properties of the product, e.g., barium sulfate in particular enhances the sound-deadening properties. Preferably, talc is employed in the composition in an amount of at least 1 part by weight based on 100 parts by weight of the polyolefin resin. Generally, if employed in the composition, these other conventional inorganic fillers would be employed in amounts of up to about 180 parts by weight based on 100 parts by weight of the polyolefin resin. When such conventional inorganic fillers are employed in the composition in these amounts, in addition to the talc, the talc is preferably employed in the composition in amounts between about 1 and about 10 parts by weight (based on 100 parts by weight of the polyolefin resin). If these other conventional fillers are not employed in the composition, however, the ground talc, if employed, could generally be employed in amounts greater than about 10 parts by weight.

Other optional materials which may be included in the composition are stabilizers, pigments, i.e., color concentrates, and wax or other plasticizers useful to improve the flow characteristics and thus aid in the extrusion of the composition. Exemplary of such extrusion aids are polyethylene wax, mixtures of natural waxes and wax derivatives, vegetable fats, partially oxidized polyethylene, polyterpene resins and the like. If the compositions according to the present invention contains wood, they can, of course, contain agents which neutralize the acidity of the latter, such as, for example, sodium silicate. The composition may also optionally include ground scrap materials of similar or compatible compositions. Generally, such ground scrap thermoplastic, if employed, would be employed as less than about 25 percent by weight of the composition, and in a particle size of about ¼ inch or less. Reusing scrap thermoplastic material, e.g., that formed according to this invention, in this way is economically advantageous.

The extrudable compositions according to the present invention are formed according to known techniques for mixing and extruding filled thermoplastic compositions. According to such techniques, the components of the composition are first charged into an apparatus, e.g., a Prodex or Henschel mixer, ribbon blender or a tumbler which mixes the components and forms a substantially homogenous mixture. If a Prodex or Henschel type mixer is employed, all the components of the composition can be charged in the mixer at one time and mixed at a speed sufficient to prepare a homogenous blend. Generally, the sequence of addition of the components to the mixer is not significant, provided that the final mixture is thoroughly mixed to obtain homogeneity. In some cases, necessary heat for mixing may be supplied partly or wholly by the mechanical heat generated by the intensive mixing. After a sufficient mixing period, generally about six minutes, cooling water may be circulated around the mixer and the speed is reduced so that the blend remains a powder. Then the powdered composition is fed into an apparatus capable of extruding the composition, e.g., into sheets or panels. As will be apparent to those skilled in the art in view of the present disclosure, a single apparatus train may be employed to mix and extrude the composition. In extruding the sheets and panels, the composition is brought to a temperature above the melting point of the thermoplastic composition and below the combustion temperature of the cellulosic particulate. Thereafter, if desired, these sheets and panels can be shaped into articles such as package trays used in automobiles. The shaping of the sheets or panels, when reheated to the above mentioned temperature, directly or after storage, is done either under pressure in temperature controlled molds or by vacuum thermoforming. The articles can be modified to make them optimally suitable for their intended use, e.g., by painting, embossing, or by applying various materials such as fabric or carpeting, to their surface. Additionally, while the disclosure of the present invention has been directed to a composition and article particularly suitable for use in automobiles, use of such composition and article is not meant to be limited to this use. The composition, panel and article disclosed herein may be employed wherever conventional wood-filled thermoplastic components are employed. They are, however, particularly suitable for use in applications requiring thermoplastic, wood-filled components having inherent sound-deadening properties, as is apparent to one skilled in the art in view of the present disclosure.

The invention will be further understood by referring to the following detailed examples. It should be understood that the specific examples are presented by way of illustration and not by way of limitation. In the present disclosure, "parts" is intended to mean "parts by weight".

EXAMPLE 1

An extrudable composition according to the present invention was made from the materials listed below.

| Composition | Parts by Weight |
| --- | --- |
| polypropylene homopolymer[1] | 100 |
| wood flour[2] | 72 |
| talc[3] | 3.5 |
| Santoprene 201-64[4] | 91 |
| color concentrate[5] | 10 |
| barium sulfate[6] | 67 |

| Composition | Parts by Weight |
| --- | --- |
| wax[7] | 6 |

[1]Soltex 91X01, trademark, Soltex, Polymar Corp., Houston, Texas.
[2]#402 available from Wisconsin Wood Fibers, Schofield, Wisconsin, a −40 mesh pine wood flour having a particle size of about 0.15–0.425 mm.
[3]Pfizer 2131, trademark, Pfizer Minerals, Pigments and Metals Div., NY, NY.
[4]Trademark, Monsanto Chemical Co., crosslinked EPDM/polypropylene (60/40 by weight).
[5]Schulman 3225, trademark, A. Schulman Co., Akron, OH.
[6]#22 Barytes, trademark, Thompson, Weinman & Co., Cartersville, GA.
[7]Hoechst PE 520, trademark, American Hoechst Corp., Specialty Products Groups, Somerville, NJ, a polyethylene wax.

The components listed above were premixed for six minutes in a Prodex mixer at high speed and then the particulate mixture was transferred to a hopper on a Leistritz ZSE 67 66-700 counter rotating 29:1 (length-:diameter) extruder. The mixture was extruded through a sheet die having an opening 3.2 mm thick which resulted in extruded panels of 1.6 mm thickness. A thin (about 0.003 inch thick) polypropylene copolymer film was adhered to the surface of the sheet in the cooling stack to provide better adhesion for the carpet material to be applied during molding. The sheet was then heated to 360° F. in an infrared oven and then transferred to a temperature controlled steel tool in a hydraulic press. A 9 ounce/square yard polypropylene carpet was also placed in the mold along with the hot panel. The heated panel and carpet were then pressed at 40–70 psi into a package tray. An 18 ounce/square yard cotton fiber pad was adhered to the reverse side with adhesive.

Acoustic tests (the Ford Motor Company's Road Test or Interior Noise Level Evaluation) of the package tray made as described above as well as of a standard and a current production model package tray were conducted. The standard package tray was formed from conventional wood-filled polypropylene and had a 10 ounces/square yard reclaimed synthetic fiber pad beneath a 9 ounce/square yard carpet on one side and a shoddy cotton (reclaimed) fiber pad of 18 ounces/square yard on the backside of the tray. The current production tray was made of reclaimed fibers bonded in a variable thickness using phenolic resin to maintain the final shape. A 9 ounce/square yard carpet was adhered to the top side with an adhesive. The tests showed that the sound reduction for the present invention package tray was equivalent to the current production model and better by 4–5 dB than the standard wood filled polypropylene package tray in the 200–250 HZ range, considered a key reverberation point in vehicles. In additional acoustic tests, (as defined above) the tray made according to the present invention in this example showed sound-deadening properties superior to the current production tray and far superior to the standard package tray.

EXAMPLE 2

An extrudable composition is made according to the present invention and extruded into a panel from the following components according to the procedure described in Example 1.

| Composition | Parts by Weight |
| --- | --- |
| polypropylene homopolymer[1] | 100 |
| wood flour[2] | 70 |
| talc[3] | 2 |
| Santoprene 201-64[4] | 100 |

| Composition | Parts by Weight |
| --- | --- |
| barium sulfate[5] | 100 |

[1]Soltex 91X01, trademark, Soltex.
[2]#402 available from Wisconsin Wood Fibers, −40 mesh pine wood flour having a particle size of about 0.15–0.425 mm.
[3]Pfizer 2131, trademark, Pfizer Minerals, Pigments & Metals Div.
[4]Trademark, Monsanto Chemical Co., crosslinked EPDM/polypropylene (60/40 by weight).
[5]#22 Barytes, trademark, Thompson, Weinman & Co.

The extruded panels and formed parts made according to this example have better sound-deadening properties than the panels made according to Example 1 due to the use of relatively more barium sulfate in the composition.

EXAMPLE 3

An extrudable composition is made according to the present invention from the materials listed below and extruded into panels according to the procedure of Example 1.

| Composition | Parts by Weight |
| --- | --- |
| polypropylene homopolymer[1] | 100 |
| wood flour[2] | 100 |
| talc[3] | 6 |
| Santoprene 201-64[4] | 80 |
| color concentrate[5] | 6 |
| wax[6] | 2 |

[1]Soltex 91X01, trademark, Soltex.
[2]#402 available from Wisconsin Wood Fibers, a −40 mesh pine wood flour having a particle size of about 0.15–0.425 mm.
[3]Pfizer 2131, trademark, Pfizer Minerals, Pigments & Metals Div.
[4]Trademark, Monsanto Chemical Co., crosslinked EPDM/polypropylene (60/40 by weight).
[5]Schulman 3225 trademark, A. Schulman Co.
[6]Hoechst PE 520, trademark, American Hoechst Corp., Specialty Products Group, a polyethylene wax.

The extruded panels are formed into a tray according to the procedure described in Example 1. This tray has good sound-deadening properties and is more flexible than the tray made in Example 1.

EXAMPLE 4

An extrudable composition was made according to the present invention from the following components and extruded into panels according to the procedure described in Example 1.

| Composition | Parts by Weight |
| --- | --- |
| polypropylene homopolymer[1] | 100 |
| wood flour[2] | 114 |
| talc[3] | 5 |
| Santoprene 201-64[4] | 35 |
| wax[5] | 3 |

[1]Soltex 91X01, trademark, Soltex.
[2]#402 available from Wisconsin Wood Fibers, a −40 mesh pine wood flour having a particle size of about 0.15–0.425 mm.
[3]Pfizer 2131, trademark, Pfizer Minerals, Pigments & Metals Div.
[4]Trademark, Monsanto Chemical Co., 60/40 crosslinked EPDM/polypropylene by weight.
[5]Hoechst PE 520, trademark, America Hoechst Corp., Specialty Products Group a polyethylene wax.

A panel was then molded into a package tray according to the procedure of Example 1. The tray had good sound-deadening properties and was stiffer than that of Example 1, but had superior flex cracking resistance.

EXAMPLE 5

An extrudable composition is made according to the present invention from the materials listed below.

| Composition | Parts by Weight |
| --- | --- |
| polypropylene homopolymer[1] | 100 |
| wood flour[2] | 70 |
| talc[3] | 2 |
| Geolast[4] | 100 |
| barium sulfate[5] | 100 |

[1]Soltex 91X01, trademark, Soltex.
[2]#402 available from Wisconsin Wood Fibers, a −40 mesh pine wood flour having a particle size of about 0.15–0.425 mm.
[3]Pfizer 2131, trademark, Pfizer Minerals, Pigments & Metals Div.
[4]Trademark, Monsanto Chemical Co., a crosslinked nitride rubber (60 percent by weight) in polypropylene.
[5]#22 Barytes, trademark, Thompson, Weinman & Co.

An extruded panel is formed into a package tray according to the procedure of Example 1. The tray has excellent sound-deadening properties.

EXAMPLE 6

An extrudable composition is made according the present invention and extruded into a panel from the following components according to the procedure described in Example 1.

| Composition | Parts by Weight |
| --- | --- |
| polypropylene homopolymer[1] | 100 |
| wood flour[2] | 100 |
| talc[3] | 6 |
| Santoprene 201-64[4] | 100 |
| color concentrate[5] | 6 |
| wax[6] | 2 |

[1]Soltex 91X01, trademark, Soltex.
[2]#402 available from Wisconsin Wood Fibers, a −40 mesh pine wood flour having a particle size of about 0.15–0.425 mm.
[3]Pfizer 2131, trademark, Pfizer Minerals, Pigments & Metals Div.
[4]Trademark, Monsanto Chemical Co., crosslinked EPDM/polypropylene (60/40 by weight).
[5]Schulman 3225, trademark, A. Schulman Co.
[6]Hoechst PE 520, trademark, American Hoechst Corp., Specialty Products Group, a polyethylene wax.

The extruded panel is formed into a package according to the procedure of Example 1. The tray has good sound-deadening properties and greater flexibility than the tray of Example 1.

In view of this disclosure, many modifications of this invention will be apparent to those skilled in the art. It is intended that all such modifications which fall within the true scope of this invention be included within the terms of the appended claims.

We claim:

1. An extrudable composition suitable for producing remoldable panels having sound-deadening properties, said extrudable composition comprising a mixture of: (A) 100 parts by weight polyolefin resin having a softening point of at least about 120° C.; (B) between about 20 and about 150 parts by weight cellulosic particulate filler having a length/diameter ratio between about 1 and about 10 and a particle size between about 0.01 and about 15 mm; and (C) between about 20 and about 120 parts by weight crosslinked elastomeric rubber particles having an average particle diameter of less than about 50 microns and being dispersible in said extrudable mixture.

2. The extrudable composition according to claim 1, wherein said composition further comprises at least 1 part by weight ground talc.

3. The extrudable composition according to claim 2, wherein said composition further comprises inorganic fillers selected from calcium carbonate, iron oxide, lead oxide and barium sulfate.

4. The extrudable composition according to claim 1, wherein said polyolefin resin comprises polypropylene.

5. The extrudable composition according to claim 4, wherein said polypropylene is polypropylene homopolymer.

6. The extrudable composition according to claim 1, wherein said cellulosic particulate filler has a particle size between about 0.15 and about 0.425 mm.

7. The extrudable composition according to claim 1, wherein said cellulosic particulate filler is selected from the group consisting of soft wood flour, hard wood flour, sawdust, ground corn cobs, ground rice hulls and shell flours.

8. The extrudable composition according to claim 7, wherein the cellulosic particulate filler is selected from soft wood flour, hard wood flour and mixtures thereof.

9. The extrudable composition according to claim 7, wherein said cellulosic particulate filler has a water content of less than about 10 percent by weight.

10. The extrudable composition according to claim 1, wherein the rubber material of said crosslinked elastomeric rubber particles is selected from ethylene-propylenediene rubber, nitrile rubber, chlorinated butyl rubber, styrene-butadiene rubber, bromobutyl rubber, vinyl acetate ethylene copolymers and compatible mixtures of any of them.

11. Remoldable panels having sound-deadening properties made from the composition of claim 1.

12. Articles made by remolding the panels of claim 11.

13. A method for producing remoldable panels having sound-deadening properties, which method comprises:
providing an extrudable composition comprising a mixture of: (A) 100 parts by weight polyolefin resin having a softening point of at least about 120° C.; (B) between about 20 and about 150 parts by weight cellulosic particulate filler having a length/diameter ratio between about 1 and about 10 and a particle size between about 0.01 and about 1.5 mm; and (C) between about 20 and about 120 parts by weight crosslinked elastomeric rubber particles having an average particle diameter of less than about 50 microns and being dispersible in said mixture; and
extruding said mixture into panels while heating said composition to a temperature above the softening point of said polyolefin resin and below the temperature of substantial decomposition of said cellulosic particulate filler.

14. The method for producing remoldable panels according to claim 13, wherein said composition further comprises at least about 1 part by weight ground talc.

15. The method for producing remoldable panels according to claim 14, wherein said composition further comprises inorganic fillers selected from calcium carbonate, iron oxide, lead oxide and barium sulfate.

16. The method for producing remoldable panels according to claim 13, wherein said polyolefin resin comprises polypropylene.

17. The method for producing remoldable panels according to claim 16, wherein said polypropylene is polypropylene homopolymer.

18. The method for producing remoldable panels according to claim 13, wherein said cellulosic particulate filler has a particle size between about 0.15 to about 0.425 mm.

19. The method for producing remoldable panels according to claim 13, wherein said cellulosic particulate filler is selected from the group consisting of soft wood flour, hard wood flour, sawdust, ground corn cobs, ground rice hulls and shell flours.

20. The method for producing remoldable panels according to claim 13, wherein the cellulosic particulate filler is selected from soft wood flour, hard wood flour and mixtures thereof.

21. The method for producing remoldable panels according to claim 13, wherein said cellulosic particulate fillers have a water content less than about 10 percent by weight.

22. The method for producing remoldable panels according to claim 13, wherein the rubber material of said crosslinked elastomeric rubber particles is selected from ethylene-propylenediene rubber, nitrile rubber, chlorinated butyl rubber, styrene-butadiene rubber, bromobutyl rubber, vinyl acetate ethylene copolymers and compatible mixtures of any of them.

23. Remoldable panels having sound-deadening properties made according to the method of claim 13.

24. Articles made by remolding the panels of claim 23.

25. An extrudable composition suitable for producing remoldable panels having sound-deadening properties, said extrudable composition comprising a mixture of: (A) 100 parts by weight polypropylene resin having a softening point of at least about 120° C.; (B) between about 20 and about 150 parts by weight wood flour having a length/diameter ratio between about 1 and about 10 and a particle size of between about 0.01 and about 15 mm; (C) between about 20 and about 120 parts by weight crosslinked elastomeric rubber particles having an average particle diameter of less than about 50 microns and being dispersible in said extrudable mixture; (D) between about 1 and about 10 parts by weight ground talc; and (E) up to about 180 part by weight barium sulfate.

* * * * *

UNITED STATES PATENT AND TRADEMARK OFFICE
CERTIFICATE OF CORRECTION

PATENT NO. : 4,746,688

DATED : May 24, 1988

INVENTOR(S) : Leo T. Bistak and Daniel C. Himebaugh

It is certified that error appears in the above-identified patent and that said Letters Patent are hereby corrected as shown below:

In Claim 1, at column 11, line 61, cancel "15 mm" and replace with --1.5 mm--.

In Claim 25, at column 14, line 15, cancel "15 mm" and replace with --1.5 mm--.

Signed and Sealed this

Tenth Day of January, 1989

Attest:

DONALD J. QUIGG

*Attesting Officer*   *Commissioner of Patents and Trademarks*